Dec. 20, 1966   M. DANGAUTHIER   3,292,945
VEHICLE SUSPENSIONS
Filed Jan. 29, 1965   3 Sheets-Sheet 1
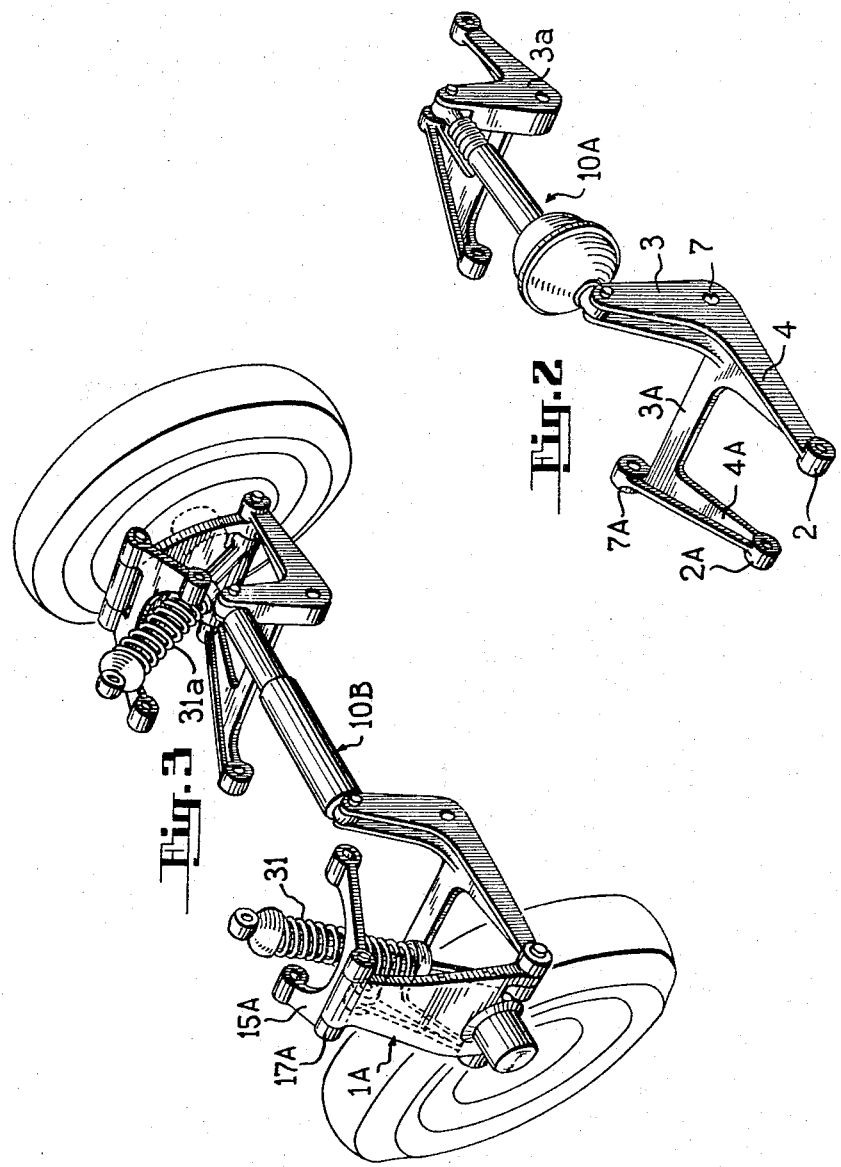

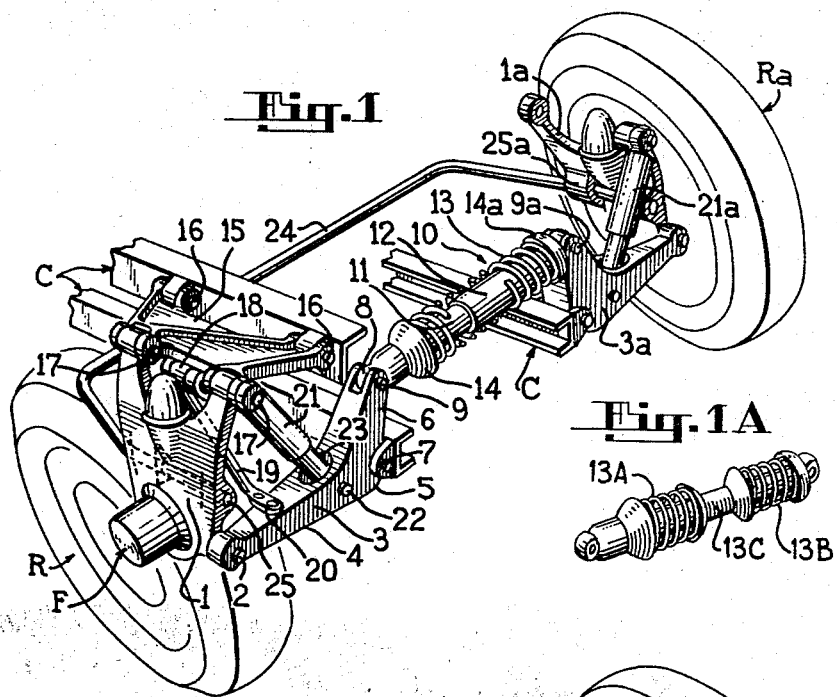
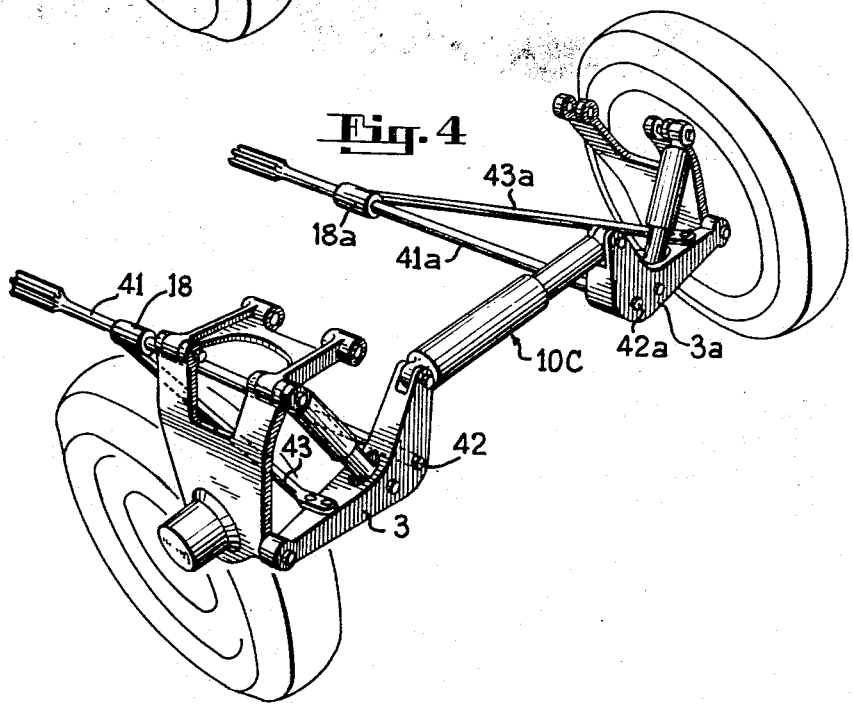

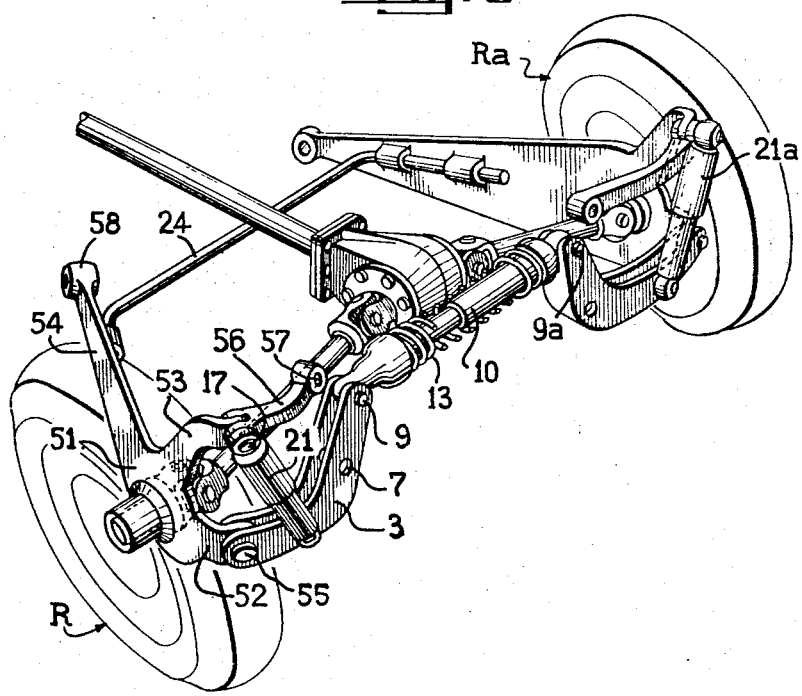

United States Patent Office 3,292,945
Patented Dec. 20, 1966

3,292,945
VEHICLE SUSPENSIONS
Marcel Dangauthier, Paris, France, assignor to La Publicite Francaise, Paris, France, a French body corporate
Filed Jan. 29, 1965, Ser. No. 429,043
Claims priority, application France, Dec. 10, 1964, 998,167
12 Claims. (Cl. 280—124)

The present invention relates suspensions for vehicles and particularly automobile vehicles and is applicable to the forward and rear sets of wheels in which each of the wheels is connected to the body of the vehicle by any device on condition that the two front wheels or rear wheels under consideration are not rigidly interconnected.

Although in the embodiment which will be described hereinafter the improvement according to the invention is applied to the rear set of wheels, it must be understood that this improvement is equally applicable to the front wheels, which could be the driving wheels.

In the present description no mention will be made of the transmission of the drive to the rear wheels, but the principle of the invention could be applied to rear driving wheels, as will be understood hereinafter.

It is known that the suspended part of a vehicle undergoes, with respect to the unsuspended part constituted by a set of wheels, to complex oscillations which could conveniently be broken down to several types of simple oscillations, such as: vertical oscillations or "pumping oscillations," and rotary oscillations about longitudinal horizontal axes, known as "rolling oscillations."

If the problem is viewed with respect to the front and rear sets of wheels, it could be said that the body is also subjected to oscillations about a transverse horizontal axis, termed "pitching oscillations."

In order to counter the effects of these oscillations it is essential judiciously to regulate the resilience of the springs and dampers or, in other words, to be able to act on the resilient means, such as mechanical springs, torsion bars or pneumatic chambers, and, secondly, on the damping means adapted to absorb progressively the energy of these oscillations.

The object of the invention is to disassociate the damping of the pumping (this expression being intended to embrace the pumping proper and the relative movements of the set of wheels under question resulting from the pitching) from the damping of the roll for the set of wheels under question. It is thus possible to determine separately, on one hand, the pumping damping means, and, on the other, the means which, owing to their energy-absorbing properties counter the effects of the rolling oscillations.

As will be understood hereinafter, the invention permits furthermore easily disassociating the stiffness in respect of pumping from the stiffness in respect of banking.

The invention provides an improved suspension which at least partly satisfies the aforementioned conditions, and in which the two wheels of the set of wheels under question are connected to the body and to each other by a symmetrical system comprising, for each of the wheels, a double-arm pivotal cranked lever, one of the ends of said lever being pivoted on a substantially horizontal and longitudinally extending pin rigid with the wheel stub axle, a median point of said lever which is located substantially at the apex of the cranked portion of the lever being pivoted to the body by a substantially horizontally and longitudinally extending pin, and the free ends of the respective cranked levers of the two wheels being interconnected by connecting means comprising, a damping system, said connecting means comprising, if desired, a resilient return system whereby a symmetrical pumping oscillation of the body relative to the wheels in the vertical plane of symmetry creates opposite symmetrical movements of the two cranked levers the energy of which is absorbed by said connected means, whereas the rolling movements create oscillations in the same direction of the cranked levers, said oscillations having no noticeable action on the damping connecting means which moves in one unit substantially along an axis which is transverse to the vehicle.

Further features and advantages of the invention will be apparent from the ensuing description with reference to the accompanying drawings to which the invention is in no way limited.

In the drawings:

FIG. 1 is a diagrammatic perspective view of a first embodiment of a suspension improved in accordance with the invention;

FIG. 1A is a view of a detail of a variant of the invention;

FIG. 2 is a partial perspective view of another embodiment of the invention;

FIG. 3 is a diagrammatic perspective view of a further embodiment of the invention;

FIG. 4 is a diagrammatic perspective view of yet another embodiment of the invention; and FIG. 5 is a diagrammatic perspective view of an application of the invention to the suspension of a rear set of wheels, described in the U.S. application No. 429,042.

In the embodiment shown in FIG. 1, a vehicle comprises a rear set of wheels R, Ra, which are mounted on stub axles, such as F. The body of the vehicle and the chassis forming the suspended part, are diagrammatically represented by U-section members C which are consequently rigidly interconnected.

The right part is not fully represented, but is symmetrical relative to the left part. The component parts thereof are designated by the same reference numerals as the left part of the suspension with the addition of the letter a.

The left part, namely the suspension of the wheel R, comprises a rigid plate 1 which is rigid with the stub axle F which carries the bearings and, if desired, the braking device. This plate is provided at the rear thereof with a substantially horizontal pin 2 which extends longitudinally of the vehicle and on which is pivoted a cranked lever 3 comprising an approximately horizontal outer arm 4, a cranked portion 5 and approximately vertical arm 6. The end of the arm 4 is freely pivoted on the pivot pin 2. This lever is pivoted to the body C by a substantially horizontal pin 7 disposed roughly in the corner of the cranked portion 5. The free end of the vertical arm 6 is connected by a pivotal connection (which in the case of FIG. 1 comprises a fork through which extends a horizontal pin 9) to one end of damping connecting means 10, the other end of which is pivoted to the pin 9a of the lever 3a related to the wheel Ra, this lever 3a being symmetrically disposed relative to the lever 3.

Said connecting means 10 comprise a tubular telescopic element composed of an inner member 11 and an outer member 12 which are respectively connected to the pins 9 and 9a, the member 12 being freely slidable on the member 11.

Disposed within this telescopic element is a damping system of any known type. The element 10 further comprises a resilient return means formed by a spring 13 which can be continuous as shown in FIG. 1 or comprise of a plurality of parts, for example two parts 13A, 13B (FIG. 1A) interconnected by a slidable sleeve 13C, which might be necessary if the median portion of the spring has an excessive diametral size.

This device can be employed as an anti-banking system by the resilient limitation of the sliding movement of said sleeve.

The ends of the resilient system comprising said springs bear against two cups 14, 14a, which are integral with each of the telescopic members. This spring is under compressive stress and urges the pins 9, 9a on the ends of the two cranked levers to move away from each other.

Further, the body is connected to the upper part of the stub axle plate 1 by a rigid plate 15, which is pivoted to the body by two aligned horizontal pins 16, 16 and to the upper end of the plate 1 by two aligned horizontal pins 17, 17.

It can be seen that the body and the three members 1, 13 and 15 constitute a deformable system of four elements pivoted together by the pins 2, 7, 16 and 17.

Preferably, the cranked lever 3 is connected to the body by a second pivotal connection 18 whose pivot pin is in alignment with the pin 7, this pivotal connection being connected to the arm 4 of the lever 3 by a strut rigidly secured to the arm at 20.

The rear pin 17 is moreover connected to the cranked lever 3 by a damper 21 whose two ends are pivoted firstly to a point rigid with the plate 15 or the plate 1, or, alternatively, as shown, to the 17 corresponding to the pivotal connection of the members 15 and 1, and, secondly, to a point 22 which can be rigid with the arm 4, as shown, and which can coincide with the pin 7. For this purpose, the lower end of the damper 21 extends into a cavity 23 in the arm 4 which is so dimensioned and located that this damper is movable relative to the arm 4.

The arrangement of the part of the suspension related to the wheel Ra is similar to that of the wheel R, but arranged symmetrically thereto. It therefore also comprises a rigid plate (not shown) similar to the plate 15 and a damper 21a identical to the damper 21.

This suspension can also comprise a spring device which introduces into the suspension of the axle an anti-banking stiffness. This device can comprise an anti-banking bar 24 of known type whose ends could be secured to the members 1 and 1a by lugs, such as 25 and 25a, or by a connecting rod whose two ends are pivoted respectively to two orthogonal pins, as described in the aforementioned U.S. patent application.

The invention can be embodied in various ways, some examples of which are shown in FIGS. 2–5 in which members similar to the members shown in FIG. 1 carry the same reference numerals.

In particular, the connecting means can comprise, as shown in FIG. 2, an oil-and-air support element 10A including resilient pneumatic means and damping means. Such devices are of known type and described, for example, in U.S. Patent No. 3,088,726. The connecting means, regardless of its type, can also comprise a seat or height corrector determining the ground clearance of the vehicle in accordance with the supported load. This device 10A (FIG. 4) performs practically the same function as the element 10 shown in FIG. 1 and is pivoted in the same manner between the ends of the upper arms of the cranked levers 3, 3a. It will be understood that this device is inserted in a hydraulic circuit (not shown).

In FIG. 2, the cranked lever is shown to be rigidly connected by an arm 3A to an arm 4A, the ends of which are provided with pivot pins 2A, 7A whose axes are in alignment with those of the pivot pins 2 and 7 respectively. These pivot pins 2A, 7A connect the lever 3 to the member 1 and to the body. The assembly 3, 3A, 4A constitutes a cast unit.

In another embodiment (FIG. 3), the connecting means for the two wheels comprise a simple damper 10B. Springs 31, 31a are provided between the body (not shown) and the wheel stub axle or, if desired, on connecting arms. By way of a variant, these springs could be connected to cranked connecting rods or links.

These springs can be, for example, concentric with dampers, as shown.

In this variant, the plate 15 is replaced by a forked member 15A pivoted to the member 1A by means of a single hinge 17A. The member 1A is a suitable variant of the member 1 shown in FIG. 1.

In the variant shown in FIG. 4, the stiffness with respect to banking and pumping are insured by a single common means comprising torsion bars 41, 41a the ends of which are secured to the cranked levers at 42 and 42a. Each of these bars can have a pin which is concentric to the pivotal connections 18 and 18a of the struts 43 or 43a.

The connecting means for the two wheels is a damper 10C.

The suspension device according to the invention operates in the following manner:

When the body undergoes relative to the wheels a vertical or pumping movement, the two wheels move symmetrically, the two levers 3 and 3a effect about their pin 7 symmetrical pivotal movements and there results, among other phenomena, an action on the connecting means 10 or similar connecting means 10A, 10B, 10C.

On the other hand, if the body effects a rolling movement relative to the wheels, the two levers 3 and 3a rotate about their pin 7 in the same direction. The connecting means 10, 10A, 10B or 10C move in one unit in a practically horizontal direction along its axis but is subjected to practically no action.

Thus, depending on whether the movement is a vertical or rolling movement, the connecting means of wheels are operative or remain inoperative. In all the variants, this element has a damping function and, therefore, introduces in a pumping movement a damping action which does not exist in the rolling movement. In the embodiments shown in FIGS. 1 and 2, the connecting means further permit introducing into the pumping movement a stiffness which does not exist in the rolling movement.

If the wheels under consideration are driving wheels, transmission shafts can be added to the system or incorporated therein in such manner as to replace, for example, the branches or the elements constituting the plate 15.

The invention can also be applied to the three-point suspension system described in the aforementioned U.S. patent application, and an embodiment of this arrangement is shown in FIG. 5.

A suspension of this type comprises, on each side, a member 51 rigid with the stub axle and comprising three arms, namely a rear arm 52, an intermediate arm 53, and a forward arm 54. The arm 52 is pivoted to the cranked lever 3 at 55, the arm 53 is pivoted to a link 56 at 17, and the link 56 is pivoted to the body at 57; the arm 54 is pivoted to the body at 58.

The free ends of the crank levers 3, 3a are pivoted to the ends of the connecting means 10 of one of the aforementioned types at 9, 9a. The stiffness can be insured by an anti-banking bar 2. The dampers 21, 21a each connect cranked levers to a point of the member 1 or to a point of the link 56, or, as shown, to the pivotal connection 17 between the members 1 and 56.

The other details of this system are described in the aforementioned U.S. patent application.

Having now described my invention what I claim as new and desire to secure by Letters Patent is:

1. In a suspension for connecting a set of wheels to the suspended part of an independent wheel vehicle, said suspension being adapted to disassociate the damping of the vertical or pumping oscillations from the damping of the roll oscillations, a symmetrical system connecting the wheels of the set of wheels together and to said suspended part, said system comprising, in respect of each wheel, a cranked pivotal lever having two arms, a first one of the arms being pivotally connected to the stub axle of the wheel to pivot about an axis which is substantially horizontal and extends substantially longitudinally of the vehicle, the cranked lever being pivotally connected substantially in the corner of the cranked portion of the lever to said suspended part by a pivot pin which is substantially horizontal and extends substantially longitudinally of the vehicle, the second arm of said arms having a free end, connecting means having two end portions spaced apart transversley of said suspended part, as damper and pivotal connections connecting said two end portions of the connecting means respectively to said free ends of the second arms of the pivotal levers, the distance between said pivotal connections of the connecting means being variable and said damper being operatively connected to said pivotal connections of the connecting means to damp any movement of said pivotal connections towards and away from each other, whereby a symmetrical pumping oscillation of said suspended part relative to the set of wheels in the vertical plane of symmetry of the vehicle produces symmetrical pivotal movements of the two cranked levers in opposite directions relative to said suspended part the energy of which is absorbed by said damper of the connecting means, whereas roll of the vehicle produces oscillations of the two cranked levers in the same direction relative to said suspended part, the last-mentioned oscillations having substantially no action on the damper of the connecting means, which latter moves bodily relative to said suspended part substantially along an axis extending transversely of the vehicle.

2. A suspension as claimed in claim 1, wherein said connecting means further comprise a resiliently yieldable return device operatively connected to said pivotal connections to oppose an elastically yieldable resistance to movement of said pivotal connections towards each other.

3. A suspension as claimed in claim 1, wherein said damper is cylindrical, the suspension further comprising a helical coil spring encompassing said damper and operatively connected to said pivotal connections of the connecting means to elastically return said cranked levers to a predetermined position.

4. A suspension as claimed in claim 1, wherein said connecting means comprise an automatic device for regulating the ground clearance of the vehicle, said automatic device being operative to ensure that said distance between said pivotal connections of the connecting means automatically resumes a constant value.

5. A suspension as claimed in claim 4, wherein said connecting means comprise an oil-and-air supporting device including a damper interposed between pivotal connections of the connecting means, said automatic device being combined with and coacting with said oil-and-air supporting device.

6. In a suspension for connecting a set of wheels to the suspended part of an independent wheel vehicle, said suspension being adapted to disassociate the damping of the vertical or pumping oscillations from the damping of the roll oscillations, a symmetrical system connecting the wheels of the set of wheels together and to said suspended part, said system comprising, in respect of each wheel, a cranked pivotal lever having two arms, a first one of the arms being pivotally connected to a pivot pin which is substantially horizontal and extends substantially longitudinally of the vehicle and is rigid with the stub axle of the wheel, the cranked lever being pivotally connected substantially in the corner of the cranked portion of the lever to said suspended part by a pivot pin which is substantially horizontal and extends substantially longitudinally of the vehicle, the second arm of said arms having a free end which is connected to the free end of the corresponding second arm of the cranked lever pertaining to the other wheel of said set of wheels by connecting means of variable length comprising a damping system, whereby a symmetrical pumping oscillation of said suspended part relative to the set of wheels in the vertical plane of symmetry of the vehicle produces symmetrical movements of the two cranked levers in opposite directions the energy of which is absorbed by the connecting means, whereas roll of the vehicle produces oscillations of the two cranked levers in the same direction, the last-mentioned oscillations having a substantially no action on the damping system of the connecting means which latter moves bodily substantially along an axis extending transversely of the vehicle, said suspension further comprising, in respect of each wheel, a link which is pivotally connected to said suspended part, a rigid plate rigid with the stub axle of the wheel and pivotally connected to the link, and a damper connecting the cranked lever to the link.

7. In a suspension for connecting a set of wheels to the suspended part of an independent wheel vehicle, said suspension benig adapted to disassociate the damping of the vertical or pumping oscillations from the damping of the roll oscillations, a symmetrical system connecting the wheels of the set of wheels together and to said suspended part, said system comprising, in respect of each wheel, a cranked pivotal lever having two arms, a first one to the arms being pivotally connected to a pivot pin which is substantially horizontal and extends substantially longitudinally of the vehicle and is rigid with the stub axle of the wheel, the cranked lever being pivotally connected substantially in the corner of the cranked portion of the lever to said suspended part by a pivot pin which is substantially horizontal and extends substantially longitudinally of the vehicle, the second arm of said arms having a free end which is connected to the free end of the corresponding second arm of the cranked lever pertaining to the other wheel of said set of wheels by connecting of variable length comprising a damping system, whereby a symmetrical pumping oscillation of said suspended part relative to the set of wheels in the vertical plane of symmetry of the vehicle produces symmetrical movements of the two cranked levers in opposite directions the energy of which is absorbed by the connecting means, whereas roll of the vehicle produces oscillations of the two cranked levers in the same direction, the last-mentioned oscillations having substantially no action on the damping system of the connecting means which latter moves bodily substantially along an axis exetnding transversely of the vehicle, said suspension further comprising, in respect of each wheel, a link which is pivotally connected to said suspended part, a rigid plate rigid with the stub axle of the wheel and pivotally connected to the link, and a damper connecting the suspended part to the rigid plate.

8. A suspension as claimed in claim 6, wherein said damper is pivotally connected to a pivot pin which pivotally connects the link to the rigid plate.

9. A suspension as claimed in claim 6, wherein said damper is pivotally connected to the cranked lever at a point substantially coincident with the pivot pin pivotally connecting the suspended part to the cranked lever.

10. A suspension as claimed in claim 1, comprising in respect of each wheel a spring interposed between the suspended part and the structure comprising the stub axle, the link and the cranked lever.

11. A suspension as claimed in claim 1, in combination with said connecting means, a suspension device including for each wheel a torsion bar extending substantially longitudinally of the vehicle and secured at one end to the corresponding cranked lever coaxially of said pivot pin of the cranked lever so as to be subjected to trosional stress in banking or pumping oscillations of the wheel.

12. A suspension as claimed in claim 1, whereni said connecting means comprise helical coil springs and a sleeve against which the coil springs bear and an anti-banking device comprising a spring interposed between the suspended part and the sleeve.

References Cited by the Examiner
UNITED STATES PATENTS

| | | | |
|---|---|---|---|
| 2,536,769 | 1/1951 | Rix et al. | 280—112 X |
| 3,086,786 | 4/1963 | Tuczek | 280—6.11 |
| 3,089,710 | 5/1963 | Fiala. | |

BENJAMIN HERSH, *Primary Examiner.*

M. S. SALES, *Assistant Examiner.*